Aug. 6, 1968 F. ULRICH ETAL 3,396,242
SELECTION CIRCUIT HAVING MAGNETIC CORE MATRIX MEANS
Filed Oct. 6, 1965
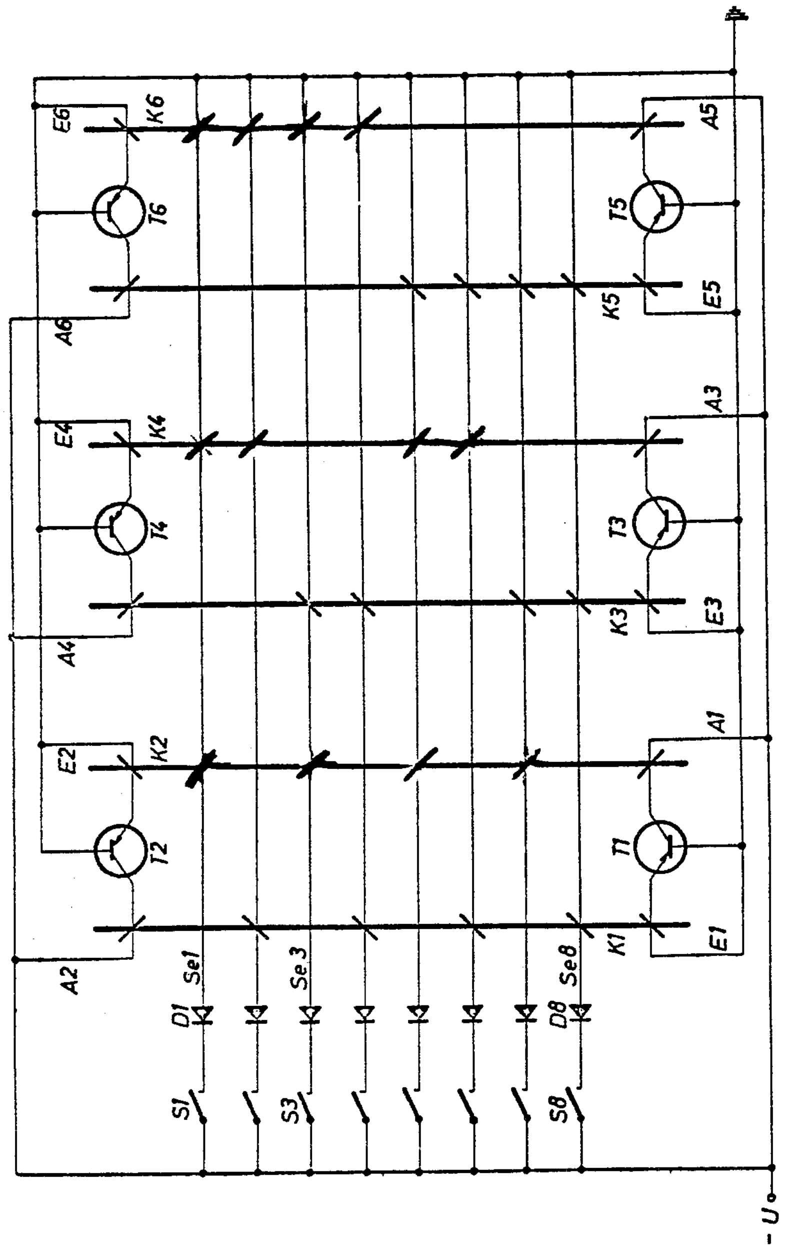

United States Patent Office 3,396,242
Patented Aug. 6, 1968

3,396,242

SELECTION CIRCUIT HAVING MAGNETIC CORE MATRIX MEANS

Friedrich Ulrich, Stuttgart-Weilimdorf, and Bernhard Villinger, Stuttgart, Germany, assignors to International Standard Electric Corporation Filed Oct. 6, 1965, Ser. No. 493,448
Claims priority, application Germany, Oct. 9, 1964, St 22,797
4 Claims. (Cl. 179—18)

The invention relates to selection circuits and more particularly to circuit arrangements designed to select one of several offered markings in data processing and telephone exchange systems.

In data processing systems and in telephone exchange systems it is necessary to select, at different points, one of several simultaneously offered marked inputs for further operation or one of several available lines to establish a telephone connection.

To meet such problems so-called selecting circuits are used. The selection circuits can be classified into two different types. The first type does the systematic selecting. The inputs are scanned in a defined sequence and the first marked line in sequence is selected for example. The second type does random selecting. In such circuits, any one of the marked inputs is statistically selected as determined by the tolerances of the components and of the input signals and by the configuration of the marked inputs. All other inputs are blocked in both types of selection circuits when the one of the marked inputs which has been selected is stable.

This invention belongs to the second type, that is, to the statistically operated selecting circuits. Such circuit arrangements represent sequence circuits wherein the outputs are reconnected to different inputs. Therefore, the circuit arrangements known to the art have an active component for each input. The number of reconnecting routes and, consequently, of decoupling elements per input is therefore some multiple of the number of said inputs. Therefore, the entire expenditure of decoupling elements decreases more than in linearity with the number of the inputs. There are also two dimensionally actuated selecting circuits known, but here too, the number of necessary decoupling means is still a multiple of the number of inputs.

An object of this invention is to provide statistically operated selecting circuits that use fewer components but nonetheless perform fully as well as prior art circuits with a greater number of components, such as decoupling and active elements.

A related object of this invention is to provide selecting circuits that serve $2^n$ inputs with $2n$ active elements, thereby requiring only $2^n$ decoupling elements. This represents the minimum of expenditure which can be achieved according to information theory.

The circuit arrangement to select one of several marked inputs is characterized in this that the electric lines are led in opposite directions through two groups of magnetic elements. In each magnetic element the input circuit of an amplifying element is inserted, and the output circuit of the amplifying element is always inserted in the magnetic element with an oppositely directed lead of the electric input lines.

The principle of selection, upon which the circuit arrangement is based can also be applied to insertions or loops of another code, but the minimum of active elements is used when applying a purely binary-coded distribution.

In one preferred embodiment, magnetic ring cores are used as magnetic elements and transistors as amplifying elements.

These and other objects and features of the selecting circuit are explained in detail with the aid of the accompanying drawing, which schematically depicts the invention.

The drawing shows the circuit arrangement diagram of a selecting circuit with eight inputs. Switches S1 to S8 are used to symbolically illustrate a marking. One of the switches S1 to S8 is closed as a mark, but several switches can be closed simultaneously. The electric input leads *Se*1 to *Se*8 are threaded through both groups of magnetic cores K1, K3, K5 and K2, K4, K6. The cores of each group are threaded in opposite directions or have opposite polarity as indicated by the different directions of the oblique lines shown at the crosspoints between the electric loop and the magnetic core where the lead is threaded through the core. The marking to the binary code distribution is transmitted via the diodes D1 to D8.

The input circuit (e.g. E4) of an amplifying element (e.g. T4) is looped into each magnetic core (e.g. K4). The output (e.g. A4) of the amplifying element is threaded in the magnetic core (e.g. K3) as a blocking winding with a contradictory loop as compared to the input leads *Se*1 to *Se*8.

An impulse transmitted to an ampliger element via the magnetic core of the input circuit causes the magnetic core with contradictory threading of the electric input loops to receive a blocking pulse from the output circuit of said amplifying element.

If, for example, only the third electric input lead *Se*3 is marked, i.e. S3 is closed, then the transistors T2, T3, and T6, associated to their code elements, are actuated. The voltage —U represents a power supply. All electric input leads, except the lead *Se*3, are blocked via the output circuits of the transistors T2, T3, and T6, and the magnetic cores K1, K4, and K5. The condition is stable during the tilt-over or reverse period. Markings, arriving further have no influence.

In practice, several markings may appear simultaneously. In that case, one marking will be considered finally as in the statistical selecting circuits known to the art and the others are precluded by blocking signals.

The number of the selected input lead can be derived from the switching conditions of the transistors, after the run-down of the selecting process.

Another switch, not shown on the drawing, can be inserted into the common grounding line of the input leads *Se*1 to *Se*8 for starting, which is closed for example, in dependence of at least one offered marking and controlled by an indicator.

The electric loops *Se*1 to *Se*8 can also be subdivided into different groups, each having a grounding switch. By this measure several independent information sources can be served successively with the same selecting device.

The example herein described shows only eight input leads *Se*1 to *Se*8, at a major number of input leads the savings for decoupling means considerably increase compared with arrangements known to the art.

While the principles of the invention have been described above in connection with specific apparatus and applications, it is to be understood that this description is made only by way of example and not as a limitation on the scope of the invention.

We claim:

1. A selector circuit arrangement for selecting one of a plurality of leads, said arrangement comprising means for marking said leads, a first and a second group of magnetic elements, means for threading said leads in a coded distribution through said magnetic elements of said first and second groups in opposite directions, a plurality of amplifying elements, each of said amplifying elements having an input and an output lead, means for threading the input of each of said amplifying elements through one of said magnetic elements, means for threading the output of each of said amplifying elements through the magnetic element of the coded distribution having the lead threaded therethrough in the opposite direction and a single decoupling means connected to each of said leads.

2. The arrangement of claim 1 wherein said plurality of leads comprise $2^n$ leads, and said plurality of amplifiers comprises $2n$ amplifiers.

3. The arrangement of claim 2 wherein said amplifying elements comprise transistors and said magnetic elements comprise torroidal cores.

4. A selector circuit arrangement for selecting at least one lead from a plurality of leads, said arrangement comprises means for individually marking said leads, a first and a second group of amplifier elements connected to said leads, a first and second group of magnetic elements connected respectively to said amplifier elements, said leads threading certain of said magnetic elements of said first group in a first direction and certain of said magnetic elements of said second group in an opposite direction; means responsive to a marking on any of said leads for actuating said magnetic elements threaded by said leads, means responsive to the actuation of said magnetic elements for operating said first amplifier elements, means responsive to the operation of said first amplifier elements for blocking said other group of amplifier elements, and one decoupling element connected to each of said leads.

References Cited

UNITED STATES PATENTS

| | | |
|---|---|---|
| 2,917,727 | 12/1959 | Reach. |
| 3,056,948 | 10/1962 | Lee. |

KATHLEEN H. CLAFFY, *Primary Examiner.*

LAURENCE A. WRIGHT, *Assistant Examiner.*